United States Patent [19]
Schmitz

[11] Patent Number: 5,664,534
[45] Date of Patent: Sep. 9, 1997

[54] FLYWHEEL SYSTEM FOR A ROTARY MACHINE

[75] Inventor: Günter Schmitz, Aachen, Germany

[73] Assignee: FEV Motorentechnik GmbH & Co., KG, Aachen, Germany

[21] Appl. No.: 650,525

[22] Filed: May 20, 1996

[30] Foreign Application Priority Data

May 20, 1995 [DE] Germany ............ 195 18 672.9

[51] Int. Cl.$^6$ ............................................. F02B 75/06
[52] U.S. Cl. ................................... 123/192.1; 74/572
[58] Field of Search ...................... 123/192.1; 74/572

[56] References Cited

FOREIGN PATENT DOCUMENTS

| | | |
|---|---|---|
| 0 612 915 | 8/1994 | European Pat. Off. |
| 0 338 485 | 9/1994 | European Pat. Off. |
| 2455176 | 11/1980 | France .......................... 74/572 |
| 4305306 | 8/1994 | Germany ....................... 74/572 |

*Primary Examiner*—Noah P. Kamen
*Attorney, Agent, or Firm*—Spencer & Frank

[57] ABSTRACT

A flywheel system for a machine includes a rotary body affixed to a rotary shaft of the machine for rotating with the shaft as a unit; an additional rotary body forming a flywheel mass and being mounted on the shaft for rotation relative thereto; an electromagnetic device for torque-transmittingly coupling the rotary bodies to one another in a contactless manner; and a control for actuating the electromagnetic device.

13 Claims, 2 Drawing Sheets

+

=

+

+

= 0

5,664,534

FLYWHEEL SYSTEM FOR A ROTARY MACHINE

CROSS REFERENCE TO RELATED APPLICATION

This application claims the priority of German Application No. 195 18 672.9 filed May 20, 1995, which is incorporated herein by reference.

BACKGROUND OF THE INVENTION

This invention relates to a flywheel system for a rotary machine, such as an internal combustion engine.

Rotary shafts in a great number of machine aggregates exhibit rotational irregularities which may be caused by the system itself and/or by load conditions. Such rotational irregularities may be usually compensated for to a substantial extent by a flywheel which is the case, for example, in piston-type internal combustion engines. Thus, the periodic torque oscillations during a cycle of operation do not appreciably affect the machine assemblies connected with the rotary shaft.

Particularly in machine aggregates in which the rpm varies as a function of operational conditions, such as in internal combustion engines for vehicles, a relatively large flywheel mass is required for reducing rotational irregularities while the vehicle is stationary and thus the engine runs in a low rpm range, while, in contrast, at higher rpm's a lesser flywheel mass would be expedient. A large flywheel mass for the flywheel means, however, that during acceleration a correspondingly high energy input is required because apart from the required acceleration of the vehicle, the flywheel itself has to be accelerated as well.

To resolve the above-outlined problem, published European Application 0 612 915 suggests to associate a second flywheel with a first flywheel attached to the crankshaft of a vehicle engine. The second flywheel is mounted on the crankshaft for free rotation relative thereto and may be torque-transmittingly coupled by a frictional clutch to the first flywheel dependent upon operational conditions. Thus, by rendering effective the second flywheel, it is possible to provide a high flywheel mass in the low rpm range of engine run. Upon acceleration and in the high rpm range the second flywheel is uncoupled so that at lower rpm's the engine operates with acceptable irregularities, while engine acceleration occurs in a more vigorous manner. By connecting the second flywheel during braking, a better braking effect is achieved. A disadvantage of such an arrangement resides in the fact that by means of the frictional clutch which represents an additional component exposed to wear, the second flywheel may only be coupled to or uncoupled from the first flywheel so that additional shock phenomena appear.

For reducing the degree of rotational irregularities in an internal combustion engine, European Patent No. 0 338 485 discloses an electric motor/generator which is mechanically coupled with the engine, and by means of which, aided by appropriate circuit arrangements, a part of the engine torque may be absorbed or an additional torque may be applied to the engine as a function of the detected operational conditions. By an appropriate control of the motor/generator it is thus feasible to influence the degree of irregularity over the entire rpm range of the engine. It is a disadvantage of such an arrangement that additional forces have to be applied to the engine at the engine mounts, requiring additional structural measures.

SUMMARY OF THE INVENTION

It is an object of the invention to provide an improved flywheel system of the above-outlined type which is of simple construction and with which irregularities exhibited by an element of a rotary machine may be eliminated or at least reduced over the entire rpm range.

This object and others to become apparent as the specification progresses, are accomplished by the invention, according to which, briefly stated, the flywheel system for a machine includes a rotary body affixed to a rotary shaft of the machine for rotating with the shaft as a unit; an additional rotary body forming a flywheel mass and being mounted on the shaft for rotation relative thereto; an electromagnetic device for torque-transmittingly coupling the rotary bodies to one another in a contactless manner; and a control for actuating the electromagnetic device.

A flywheel system according to the invention as outlined above has the advantage that a mechanically operating clutch as an additional component exposed to wear is dispensed with. Since the coupling of the flywheel mass to the rotary body affixed to the machine shaft is effected by electromagnetic means, it is feasible to bring the two rotary bodies very rapidly into an operative coupling by an appropriate control based on operational requirements. By controlling the magnetic field present between the two rotary bodies it is feasible to respond in a stepless manner to all operational conditions. The interaction between the rotary body permanently coupled to the machine shaft and the flywheel mass is brought about by the fact that an accelerating or decelerating force may be applied to the flywheel mass. For effecting a reduction in the extent of irregularities, via the additional mass an oppositely oriented accelerating or decelerating force may be applied to the rotary body (flywheel) attached to the machine shaft. Such a force is applied in a phase opposite to the acceleration or deceleration caused by the rotational irregularity.

In addition, the flywheel system according to the invention provides for the possibility to store kinetic energy in the flywheel mass during braking processes with subsequent acceleration processes and to feed the stored kinetic energy during the consecutive accelerations into the machine aggregate via the rotary body attached to the machine shaft. By means of an appropriate control of the electromagnetically operating means the behavior of the entire arrangement may be of very rigid design so that despite the finite flywheel mass the apparatus functions as a flywheel mass of infinite magnitude. In case the rotary body secured to the shaft is itself designed as a flywheel and therefore itself constitutes a significant rotary mass, the possibility is given to compensate rapidly the effect of the rotary mass of the flywheel during accelerations.

According to an advantageous feature of the invention, the electromagnetically operating means are formed by solenoids (coils) which are carried on respective pole bodies and which are distributed uniformly in the circumferential direction about one of the two rotary bodies. The coils are coupled with control means. The pole faces of the pole bodies are oriented towards the other rotary body. Expediently, the pole bodies carrying the solenoids are laminated sheet metal assemblies so that energy losses are avoided, particularly in case of an alternating energization of the solenoids with electric energy. Because in many cases the rotary mass of the rotary body affixed to the shaft should be as small as possible, the pole bodies with the solenoids are expediently arranged at the rotary body designed as the flywheel mass.

According to a further advantageous feature of the invention, the second rotary body associated with the first rotary body carrying the solenoids is provided with permanent magnets which are arranged in a uniform circumferential distribution and which are oriented towards the pole faces of the pole bodies. In such an arrangement the electromotive operation between the two rotary bodies corresponds to that of a synchronous motor.

In accordance with another feature of the invention, the second rotary body is designed as an eddy current wheel. Such a second rotary body may be, in its simplest form, made of an electrically conductive solid material (such as copper or aluminum) of appropriate thickness. The rotary body may also be designed as a cage formed of electric conductors which are uniformly distributed about the periphery of the rotary body. The electromotive operation of this arrangement corresponds to that of an asynchronous motor.

According to a further feature of the invention, the rotary body affixed to the machine shaft is designed as a flywheel. This arrangement has the advantage that a compensation for small rotational irregularities are basically given and, beyond that, in accordance with changing operational conditions, additional rotational irregularities may be counteracted by coupling the additional, freely rotatable rotary body as a flywheel mass in a controlled manner to the rotary body affixed to the shaft. In this arrangement it is expedient to design the rotary mass of the flywheel to be smaller than the effective rotary mass of the freely rotatable flywheel mass. This is of particular advantage in internal combustion engines in which it is expedient that for accelerations the rotary mass connected with the machine shaft (that is, with the crankshaft) be as small as possible.

According to a further feature of the invention, the solenoids are supplied with current by means of slip rings. Since such an arrangement is prone to wear, according to another advantageous feature of the invention, the current transmission to the solenoids is effected in a contactless manner by magnetic energy coupling by means of at least one stationary transmitter coil and at least one receiver coil carried by the rotary body.

DESCRIPTION OF THE PREFERRED EMBODIMENTS

Figure 1:
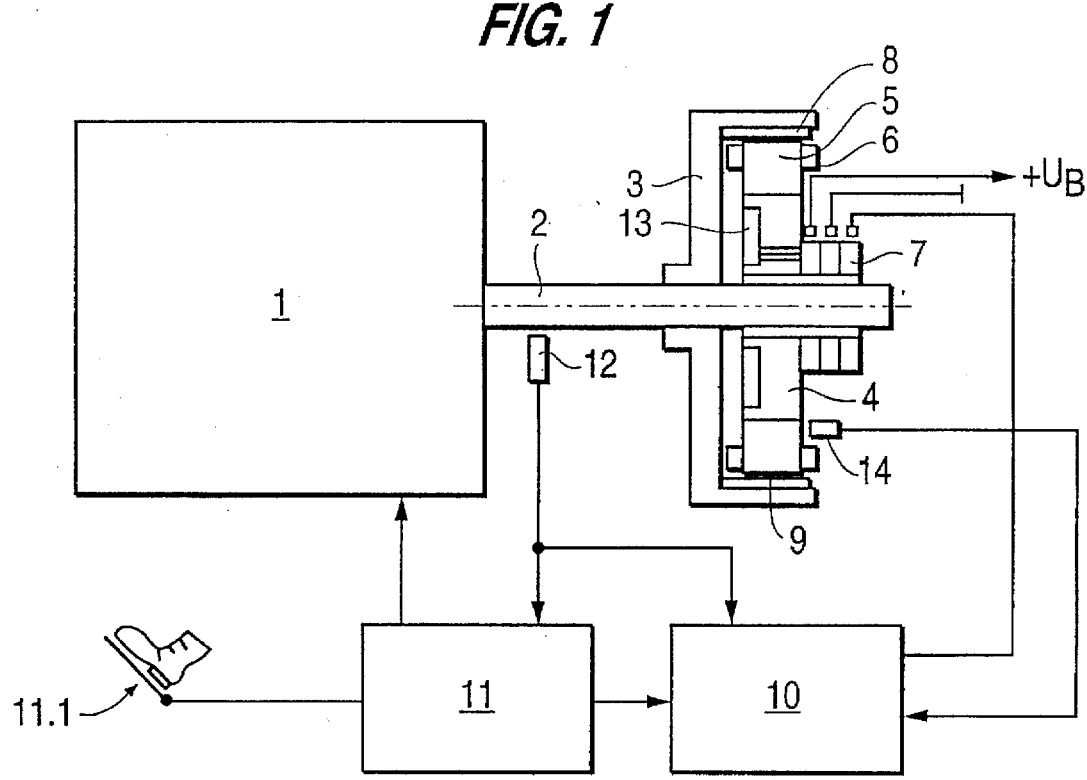
FIG. 1 is a schematic side elevational view, with block diagram, of a first preferred embodiment of the invention.

FIG. 1 schematically illustrates a piston-type internal combustion engine 1 whose crankshaft 2 is affixed to a rotary body 3 designed as a flywheel. With the rotary body 3 an additional rotary body 4 is associated which constitutes a flywheel mass. The rotary body 4 is mounted on the crankshaft 2 for free rotation relative thereto. The rotary body 3 is of dished configuration and surrounds the outer periphery of the rotary body 4. The rotary body 4 is provided along its periphery with a plurality of uniformly circumferentially distributed pole bodies 5 made of laminated sheet metal. Each pole body 5 carries a respective coil 6 connected to a voltage source $U_B$ by means of a slip ring assembly 7.

To the inner cylindrical surface of the rotary body 3 a plurality of permanent magnets 8 are secured in a uniform circumferential distribution. The magnets 8 are oriented towards the pole faces 9 of the pole bodies 5 carried by the rotary body 4. The pole faces 9 of the pole bodies 5 define a very narrow gap with the outer faces of the permanent magnets 8.

To be able to operationally couple the rotary bodies 3 and 4 to one another by virtue of an electromagnetic field, a control device (flywheel control) 10 is provided which is coupled to an engine control 11. With the engine control 11 and the flywheel control 10 an rpm sensor 12 is associated which not only detects the pure rpm of the crankshaft 2 but also responds to rpm changes, that is, it responds to the degree of irregularity in the shaft rotation.

The flywheel control 10 is coupled by means of a slip ring assembly 7 with an electronic power circuit 13 mounted on the rotary body 4. If the rpm sensor 12 determines an irregularity in the rotation of the shaft 2 at a given rpm, then by means of the flywheel control 10 and with the aid of the electronic power circuit 13 electric current is supplied to the coils 6 in such a manner that in case of an acceleration a magnetic field is built up through the rotary body 4 which generates a countertorque, while in case of a deceleration a forwardly rotating magnetic field is generated. In this manner the rotary body 3 is either decelerated or accelerated. Since by means of the rpm sensor 12 and the correspondingly programmed flywheel control 10 the extent of irregularity may be detected, the flywheel control 10 may control the supply of current to the coils 6 in such a manner that the irregularity may be substantially completely compensated for.

The control arrangement described above may be used, for example, for an engine installed for stationary operation. Such an engine runs practically with a constant rpm, and the changes in the degree of irregularities occur only in response to different load conditions.

If, however, an engine of the above type is used in an automotive vehicle then, by virtue of the connection with the engine control 11, the need arises to control the rotary body 4 (flywheel mass) also as a function of the momentary operational condition of the engine 1. Thus, for example, in case of an acceleration, the engine control 11 may be controlled by an accelerator pedal 11.1 such that the current supply is interrupted, so that during the acceleration of the engine only the flywheel mass of the rotary body 3 needs to be brought to the higher rpm. As soon as the acceleration process is terminated, that is, the vehicle is moved with a practically constant travelling speed and thus the engine operates with a constant rpm, the rpm sensor 12 again senses the irregularity as described above, and thus the rotary body 4 is activated by coupling it to the rotary body 3.

If an additional rpm sensor 14 is associated with the rotary body 4 which senses the momentary actual rpm of the rotary mass and if the measuring value is applied by means of the flywheel control 10 to the engine control 11, further possibilities for an optimal control of the coils are obtained. Thus, for example, it may be determined from the rpm information whether further energy feed (that is, an rpm increase of the rotary body 4) is appropriate. In such a case, during braking processes, by means of a corresponding control of the coils 6, the rotary body 4 is "added" with its greater flywheel mass so that the latter is accelerated.

The engine control 11 and the flywheel control 10, however, may also be so designed that for the amplification of the braking process a countertorque is applied by means of an appropriate control of the rotary body 4 for amplifying the braking torque. For this purpose, the speed of the rotary body 4 is brought to higher rpm's so that in case of a successive acceleration, the applied energy may be again inputted by an appropriate coupling of the rotary body 4.

Figure 2:
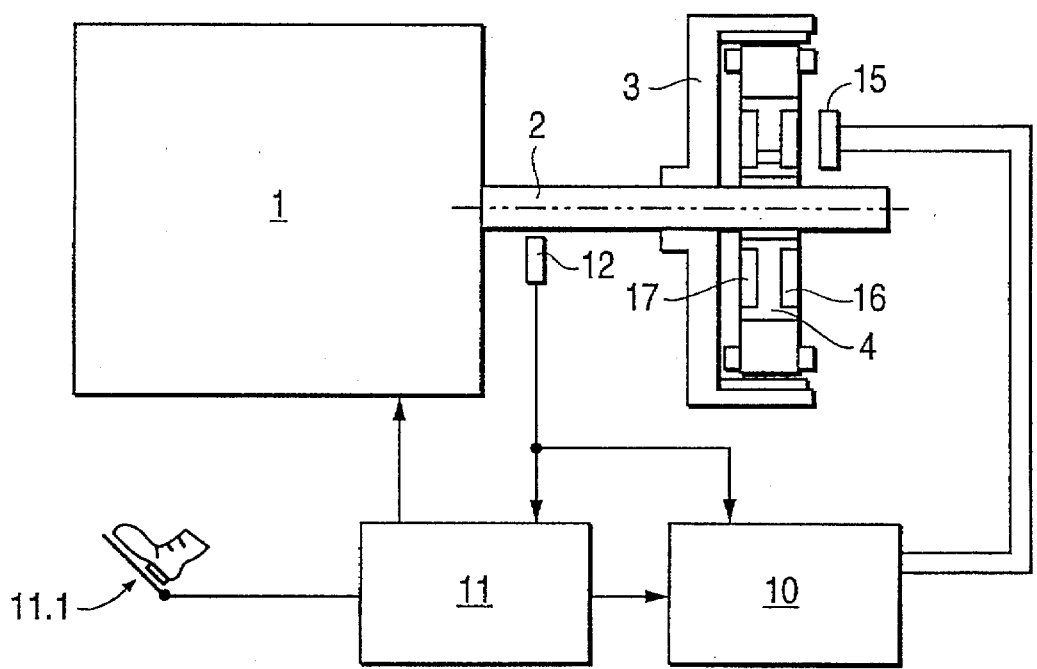
FIG. 2 is a schematic side elevational view, with block diagram, of a second preferred embodiment of the invention.
Figure 3A:
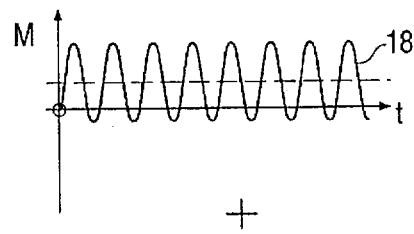
FIG. 3 illustrates a series of torque and rpm curves illustrating the measurable rotary irregularities in an internal combustion engine.
Figure 3B:
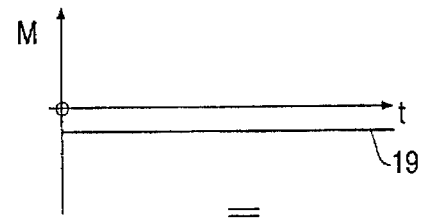
Figure 3C:
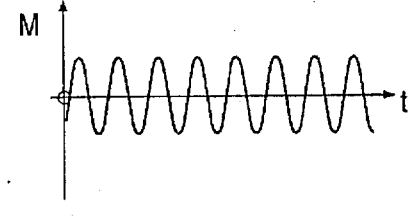
Figure 3D:
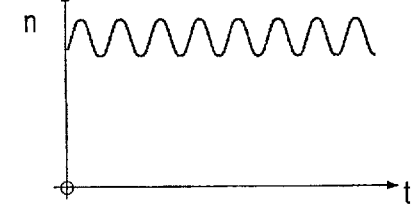
Figure 4A:
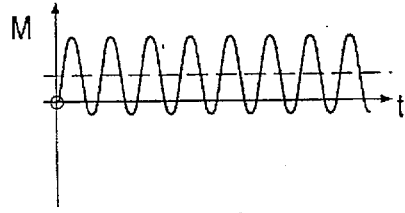
FIG. 4 illustrates a series of diagrams to show conditions of irregularities with the use of an additional rotary body designed as a flywheel mass.
Figure 4B:
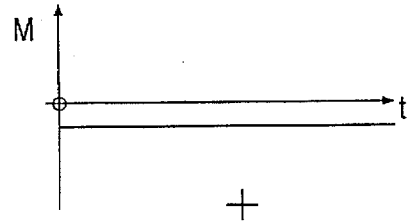
Figure 4C:
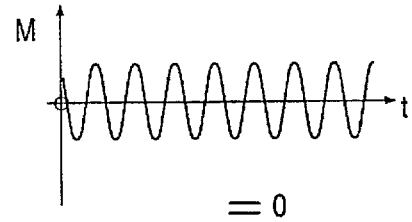
Figure 4D:
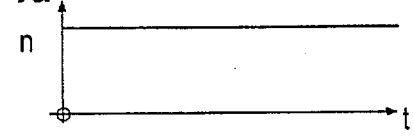
Figure 4E:
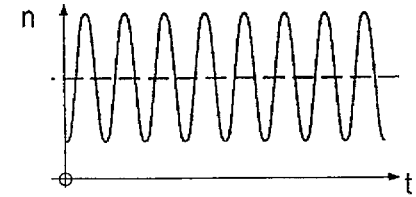

The embodiment illustrated in FIG. 2 corresponds in principle to that of FIG. 1. The embodiment of FIG. 2 differs from that of FIG. 1 essentially in that instead of the slip ring transmission device 7 the coils 6 are supplied with current by means of magnetic energy coupling, preferably with the aid of several, stationarily-supported transmitter coils 15 and several receiver coils 16 which are mounted on the rotary body 4 and which cooperate with the transmitter coils 15. The control signals for the electronic power circuit 13 too, are transmitted by means of the transmitter and receiver coils 15 and 16, respectively.

In principle, it is feasible to integrate the separately shown flywheel control 10, the engine control 11 and/or the electronic power circuit 13 into a single circuit unit.

It will be understood that in the arrangement described in conjunction with FIGS. 1 and 2, the location of the permanent magnets 8 and the coils 6 may be reversed, that is, the permanent magnets 8 may be attached to the rotary body 4 whereas the coils 6 may be mounted on the rotary body 3. Also, it is not necessary to provide the air gap radially in the circumferential direction as shown in the embodiments. It is thus possible to so design the arrangement that the air gap is situated not between the two mutually facing circumferential surfaces of the rotary bodies, but between facing end surfaces (radial faces) of the two rotary bodies. In such an arrangement both rotary bodies may be of disk-shaped configuration.

Instead of the illustrated and described permanent magnets 8 it is feasible to provide a cage formed of electric conductors. Or, instead of such a cage it is also feasible to make that rotary body which is not the coil-carrying component, of an electrically conductive solid material so that the latter constitutes an eddy current wheel. As concerns electromotive principles, such an embodiment corresponds to the operation of an asynchronous motor, while the embodiments according to FIGS. 1 and 2 correspond to the mode of operation of a synchronous motor.

Turning to FIG. 3, the condition of the rotational irregularities of the internal combustion engine 1 operating only with a single flywheel mass will be explained in greater detail. The diagram a) shows the actual torque input 18 of the engine 1 in an operation with a constant mean rpm. It can be seen from the diagram that the irregularity of the excitation is caused by the intermittent combustion in the engine. In diagram b) the torque curve 19 shows the torque input from the consumer (in the present case the vehicle gear) which has a negative effect. Upon superimposing the two torques, the alternating torque excitation of the rotary body 3 as shown in the diagram c) results. While taking into consideration the flywheel mass of the rotary body 3, there is obtained, as shown in diagram d), the resulting irregularity of the rotational behavior of the rotary body 3 which functions as a flywheel.

FIG. 4 shows the torque curves a), b) and c) as well as the rpm curves d) and e), illustrating the conditions that can be obtained by using, in an arrangement according to FIG. 1, an additional rotary mass 4 which may be brought into operative connection with the rotary body 3 by an electromagnetically controlled coupling. The curves a) and b) correspond to curves a) and b) of FIG. 3. Since by means of a corresponding electromagnetic coupling the additional flywheel mass of the rotary body 4 has an effect on the rotary irregularities of the rotary body 3, there is obtained, by connecting an additional torque according to curve c), a resulting rotary irregularity which corresponds to the curve d) of the rotary body 3 and equals zero. This means that the rotary body 3 and thus the engine shaft 2 rotate with a constant rpm. This, however, is possible only because the freely rotatably supported rotary body 4 has, with its flywheel mass, the resulting higher rotary irregularity shown in the diagram e).

It will be understood that the above description of the present invention is susceptible to various modifications, changes and adaptations, and the same are intended to be comprehended within the meaning and range of equivalents of the appended claims.

What is claimed is:

1. A flywheel system for a machine having a rotary shaft, comprising
   (a) a rotary body adapted to be affixed to the shaft for rotating therewith as a unit;
   (b) an additional rotary body forming a flywheel mass and being adapted to be mounted on the shaft for rotation relative thereto; one of the rotary bodies being a first rotary body and another of the rotary bodies being a second rotary body;
   (c) control means; and
   (d) electromagnetic means for torque-transmittingly coupling said first and second rotary bodies to one another in a contactless manner; said electromagnetic means including
      (1) a plurality of pole bodies mounted circumferentially on said first rotary body in a uniform distribution; each pole body having a pole face oriented towards a surface of said second rotary body;
      (2) a separate coil carried by each said pole body; and
      (3) means for electrically connecting each said coil with said control means for actuating said electromagnetic means.

2. The flywheel system as defined in claim 1, further comprising a plurality of permanent magnets mounted circumferentially on said second rotary body in a uniform distribution; said permanent magnets being oriented towards said pole faces.

3. The flywheel system as defined in claim 1, further comprising current-supplying means for said coils; said current-supplying means including slip rings arranged for rotation with said first rotary body and being connected to said coils for supplying said coils with current.

4. The flywheel system as defined in claim 1, further comprising contactless current-supplying means for said coils; said contactless current-supplying means including magnetic energy coupling means including a stationary transmitter coil and a receiver coil mounted on said first rotary body.

5. The machine as defined in claim 1, wherein said machine is a piston-operated machine.

6. The machine as defined in claim 5, wherein said piston-operated machine is an internal combustion engine.

7. The machine as defined in claim 6, further comprising an engine control for controlling an operation of the internal combustion engine; said control means forming part of said engine control.

8. The machine as defined in claim 7, further comprising an rpm sensor for emitting signals representing a rotational speed of said additional rotary body; said rpm sensor being connected to said engine control.

9. A flywheel system for a machine having a rotary shaft, comprising
   (a) a rotary body adapted to be affixed to the shaft for rotating therewith as a unit;
   (b) an additional rotary body forming a flywheel mass and being adapted to be mounted on the shaft for rotation relative thereto; said rotary body adapted to be affixed to the shaft having a flywheel mass less than an effective flywheel mass of said additional rotary body;
   (c) electromagnetic means for torque-transmittingly coupling the rotary bodies to one another in a contactless manner; and
   (d) control means for actuating said electromagnetic means.

10. A flywheel system for a machine having a rotary shaft, comprising
    (a) a rotary body adapted to be affixed to the shaft for rotating therewith as a unit; said rotary body being of an electrically conductive solid material to form an eddy current wheel;
    (b) an additional rotary body forming a flywheel mass and being adapted to be mounted on the shaft for rotation relative thereto;
    (c) electromagnetic means for torque-transmittingly coupling the rotary bodies to one another in a contactless manner; and
    (d) control means for actuating said electromagnetic means.

11. A flywheel system for a machine having a rotary shaft, comprising
    (a) a rotary body adapted to be affixed to the shaft for rotating therewith as a unit; said rotary body being a flywheel;
    (b) an additional rotary body forming a flywheel mass and being adapted to be mounted on the shaft for rotation relative thereto;
    (c) electromagnetic means for torque-transmittingly coupling the rotary bodies to one another in a contactless manner; and
    (d) control means for actuating said electromagnetic means.

12. A flywheel system for a machine having a rotary shaft, comprising
    (a) a rotary body adapted to be affixed to the shaft for rotating therewith as a unit;
    (b) an additional rotary body forming a flywheel mass and being adapted to be mounted on the shaft for rotation relative thereto;
    (c) electromagnetic means for torque-transmittingly coupling the rotary bodies to one another in a contactless manner;
    (d) control means for actuating said electromagnetic means; and
    (e) an rpm sensor for emitting signals representing a rotational speed of the shaft; said rpm sensor being connected to said control means.

13. A flywheel system for a machine having a rotary shaft, comprising
    (a) a rotary body adapted to be affixed to the shaft for rotating therewith as a unit;
    (b) an additional rotary body forming a flywheel mass and being adapted to be mounted on the shaft for rotation relative thereto;
    (c) electromagnetic means for torque-transmittingly coupling the rotary bodies to one another in a contactless manner;
    (d) control means for actuating said electromagnetic means; and
    (e) an rpm sensor for emitting signals representing a rotational speed of said additional rotary body; said rpm sensor being connected to said control means.

* * * * *